United States Patent Office 3,330,650
Patented July 11, 1967

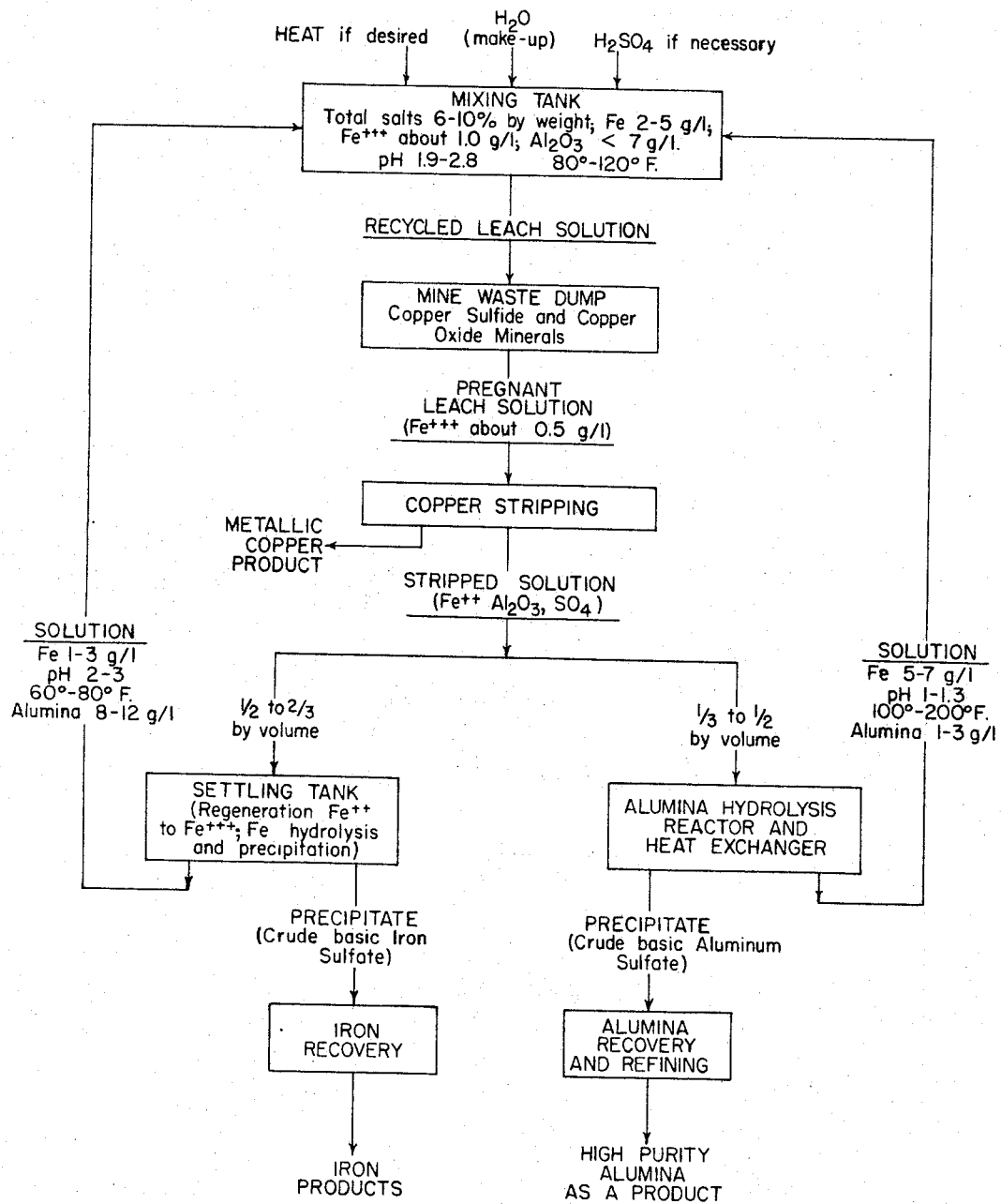

3,330,650
pH ADJUSTED, CONTROLLED-IRON-CONTENT, CYCLIC LEACHING PROCESSES FOR COPPER-BEARING ROCK MATERIALS
Stuart R. Zimmerley, Emil E. Malouf, John D. Prater, and Alfred Kenneth Schellinger, all of Salt Lake City, Utah, assignors to Kennecott Copper Corporation, New York, N.Y., a corporation of New York
Filed June 29, 1964, Ser. No. 378,839
20 Claims. (Cl. 75—104)

This invention relates to the leaching of copper-bearing rock materials, such as ore, mine waste, smelter slag, and flotation middlings and tailings, and is concerned with improvements in known cyclic leaching processes wherein the spent and barren leach solution is subjected to conditioning treatment prior to being recycled through the material being leached.

Cyclic leaching processes of this type form the subject matter of Scott U.S. Patent No. 2,563,623, Zimmerley et al. U.S. Patent No. 2,829,964, and Zimmerley et al. copending application for U.S. Patent, Ser. No. 223,206, filed Sept. 12, 1962, entitled, "Process for Leaching Copper from Low-Grade, Copper-Bearing, Metallurgical Materials."

The present process differs from these prior processes in the application of certain controls and in the incorporation of certain procedures to yield better recovery of copper more economically and with greater overall efficiency, while, at the same time, conserving water and recovering valuable by-products.

By far the greatest use of leaching processes of the type concerned is in connection with mine waste dumps containing ore materials so low in grade with respect to copper mineral content, as to not warrant metallurgical processing in the usual manner. Millions of gallons of water are involved in the daily recycling of leach solution for a large scale operation of this kind. Inasmuch as these operations are usually located in arid or semi-arid regions, water consumption is a problem of primary importance. Impurities build up in the recirculated solution and ordinarily necessitate a continual bleeding off of part of the solution and its replacement with fresh water. It is usual in ordinary dump leaching practice to replace, daily, as much as thirty percent of the total water recirculated. Most important among the impurities that build up in the recirculated leach solution are iron, aluminum, and sulfate ions.

In the cyclic leaching process of the present invention, following stripping of copper from the pregnant solution, iron is hydrolyzed and precipitated from the spent and barren leach solution in a suitable reservoir in the same manner as but usually to a greater extent than in the process of the aforementioned Scott patent, so that a minimum of ferric iron is contained by the pregnant leach solution coming from the dump. Regeneration from ferrous to ferric is preferably accomplished by bacteria as taught by the aforementioned Zimmerley et al. patent.

In accordance with the invention, the spent and barren leach solution is also treated for the removal of alumina and sulfate impurities, it being preferred that the stripped solution be divided into two parts, one part being subjected to regeneration, hydrolysis, and precipitation of iron and the other to treatment for the removal of aluminum and sulfate ions as basic aluminum sulfate.

Prior to recycling the leach solution, a mineral acid—preferably sulfuric—is added thereto to lower its pH to within the range specified in the aforementioned copending application Ser. No. 223,206.

Heretofore, where positive quantitative control of iron in the leach solution has been considered important, as in the afore-referred-to Scott patent, control of deposition of basic iron sulfate has been the sole criterion. We have now found, however, that with pH control exercised in accordance with afore-referred-to copending application, rehabilitation of old dumps theretofore clogged by accumulations of basic iron sulfate is so complete and the flow of leach solution through dumps and other massed ore materials not theretofore encumbered with basic iron sulfate is so free that significant quantities of unconsumed ferric sulfate appear in the effluent leach solution after the recycling procedure has been carried on for extended periods of time, which periods vary in length in accordance with conditions existing in the respective areas concerned. For example, where the material being leached is relatively high in iron, the build-up of total iron salts in the recycled solution will be relatively rapid and, unless such iron content is drastically reduced, will result in excessive quantities of ferric sulfate in the pregnant effluent solution emerging from the dump.

Ferric sulfate in the effluent leach solution going to copper precipitation is undesirable. Where precipitation of the copper is effected by passing the pregnant leach solution into intimate contact with metallic iron, part of such metallic iron is wastefully consumed by the ferric sulfate, resulting in an undesirable increase in the quantity of ferrous iron in the recycled barren solution. Not only is there an uneconomic consumption of metallic iron, but, over a period of time, the recycling procedure becomes less and less efficient by reason of the tendency for the increasing build-up of iron content to a point where regeneration techniques are not capable of effectively accomplishing what they are designed to do. Similar problems exist with other methods of stripping the copper from solution. Accordingly, we have found that it is very important to check for and control the ferric iron content of the effluent leach solution.

As one basis for the present invention, it was discovered that the presence of excessive amounts of ferric sulfate in the effluent leach solution coming from copper ore materials subjected to leaching by a weakly acidic, ferric sulfate, leach solution, whose pH is substantially in the range of 1.9 to 2.8, or of 1.9 to 2.4 in the instance of basic-iron-sulfate-clogged masses of ore materials (preferably about 2.1 in any instance), is significantly reduced, without sacrifice of beneficial results of the specified pH control, if the total iron content of the recycled leach solution is kept at a drastically low level.

Iron content of a stripped and barren leach solution coming from the copper precipitation stage of a cyclic leaching process applied to copper ore materials is normally quite high, ranging upwardly from somewhat below 8 grams per liter. We have found that, for the usual dump with pH control exercised as specified above (i.e., in accordance with afore-referred-to copending application Ser. No. 223,206), the pH adjusted, recycled solution has only about 2 to 4 grams per liter of iron until recycling has continued for a period of from several to many months, depending upon conditions, whereupon there is a build-up of total iron content to from about 4.5 to 6.0 grams per liter, of which about 2.5 grams per liter is ferric iron. We have also found that no more than 2 grams per liter of iron is required in the recycled leach solution and that, if control of iron content is exercised throughout the cyclic process to keep total iron content of the recycled solution within the range of about 2 to 5 grams per liter (ferric iron content about 1.0 gram per liter), depending upon the nature of the ore materials being subjected to leaching, copper yield will remain within the tremendously increased amounts shown in our afore-referred-to copending application Ser. No. 223,206 and there will be very little (usually not more than 0.5 g./l.) ferric iron in the effluent leach solution going to the copper precipitation stage.

As previously indicated, we have found it essential to also prevent the build-up of aluminum and sulfate ions in the solution being recirculated. In accordance with the invention, this is best accomplished by dividing the flow of spent solution from the copper precipitation stage and passing from two-thirds to one-half of it to a regeneration reservoir for the precipitation of basic iron sulfate and the remaining from one-third to one-half of it to heat treatment for the hydrolysis and precipitation of basic aluminum sulfate. None of the solution is bled off and passed to waste as a normal practice. Essentially all of the water is salvaged for re-use, make-up water being necessitated only by evaporation and ordinary operating losses.

Maintaining the pH-adjusted, recycled, leach solution at as high a temperature as possible from a practical standpoint is shown by our aforementioned copending application Ser. No. 223,206 to be very desirable from the standpoint of increased recovery of copper. It is a feature of the present invention that the aforesaid heat treatment of a portion of the recycled solution for alumina hydrolysis contributes significantly to the maintaining of the elevated temperature naturally acquired by it from the leaching phase of the process, despite heat losses that may be occasioned in the iron hydrolyzing reservoir.

It is also a feature of the invention that the alumina hydrolysis in and of itself ordinarily produces sufficient acid to bring about the required pH adjustment of the recycled leach solution.

The invention is described in detail and is illustrated in the accompanying drawing with respect to specific procedures presently regarded as the best mode of carrying out the process in actual practice. From these, other more specific objects and features of the invention will become apparent.

The single figure of the drawing constitutes a flow sheet representing presently preferred practice as applied to a mine waste dump.

Referring to the drawing:

A typical mine waste dump will contain about 0.2% copper on the basis of various copper sulfide and copper oxide minerals, e.g., azurite, $Cu_3(OH)_2(CO_3)_2$, malachite, $Cu_2(OH)_2CO_3$, chrysocolla, $CuSiO_3$, chalcocite, $Cu_2S$, chalcopyrite, $CuFeS_2$, covellite, $CuS$, and cuprite, $Cu_2O$, in the waste rock made up largely of alumino-silicates and iron compounds. A leach solution recycled through the dump will normally contain both sulfuric acid and ferric sulfate. In accordance with the teachings of our aforementioned copending application Ser. No. 223,206, it will have a pH between 1.9 and 2.8, preferably 2.1. In accordance with the present invention, its total iron content should not be above the range 2–5 grams per liter and ferric iron content should not be above about 1.0 gram per liter.

The effluent leach solution emerging from the dump will be pregnant principally with copper, iron, alumina, and sulfate ions, and will be passed through a copper precipitation stage. Precipitation of the copper is usually by contact with metallic iron in the customary cementation procedure, either in powder form in cone precipitators of the type disclosed in the copending application for patent of Alexander E. Back et al., Ser. No. 181,001, entitled, "Process and Apparatus for the Precipitation of Copper From Dilute Acid Solutions," or in customary scrap form in the usual launders. However, other means for stripping the copper from the pregnant leach solution, e.g., electrolysis, can be used.

Copper precipitation results in a metallic copper product and a stripped solution containing principally ferrous iron, alumina, and sulfate impurities and having a pH of about 3.0 to 3.5.

Further in accordance with the invention, the stripped solution is divided into two parts, one part being passed to a settling tank or other reservoir for regeneration, hydrolysis, and precipitation of iron, to reduce, where need be, the total iron content to an amount within the range of 2 to 5 g./l., and the other part to heat treatment in a reactor for hydrolysis of alumina.

It is presently preferred to pass from one-half to two-thirds by volume of the stripped solution to the settling tank for iron removal, depending upon the total iron content. The pH of the solution will ordinarily be about 3.5 initially. The presence of thiobacillus ferro-oxidans will rapidly oxidize ferrous iron to ferric iron, as disclosed in Zimmerley et al. U.S. Patent No. 2,829,964. The exercise of proper pH control will result in the hydrolysis and precipitation of basic ferric sulfate, see Scott U.S. Patent No. 2,563,623.

In accordance with the present invention, such regeneration and pH control is exercised to reduce the total iron content to within the range of from about 2 to 5 grams per liter with about 1.0 g./l. being ferric iron or to maintain it within that range, whichever is called for by existing condition of the stripped leach solution. Generally speaking, regeneration and removal of iron from the solution will require no more than twenty-four hours. It should be realized that regeneration of the leach solution will continue in the upper reaches of the dump, and will be especially effective under the influence of thiobacillus ferro-oxidans therein.

As disclosed by our aforementioned copending application Ser. No. 223,206, the temperature of the effluent solution emerging from the bottom of the dump will be at least about twenty degrees above ambient, e.g., as high as 120° F., and unusually great yields of copper will be obtained at the elevated temperature. Accordingly, it will be highly advantageous to maintain the effluent temperature, so far as is practical, throughout the recycling procedure.

The crude basic iron sulfate precipitated by iron hydrolysis constitutes a valuable by-product of the overall process of the invention and is either recovered and sold as such or sent to a treatment plant for placing it in appropriate form, e.g., ferric sulfate salts, for marketing. The low-iron-content solution is passed to a proportioning and mixing tank for pH and temperature control prior to recycling through the dump.

The pH and temperature control is effected to a significant extent by mixing of this solution with that portion of the total stripped solution which has been treated for the elimination of alumina and sulfate impurities. The relative amounts going to the respective treatments will be controlled on the basis of the characteristics desired for the final solution recycled through the dump. Thus, a pH of about 2.1, and in any event between about 1.9 and 2.8, a total iron content as close to 2 as possible (usually from 2 to 5 grams per liter, with not more than 1.0 g./l. being ferric) the highest possible elimination of alumina (usually to less than 7 g./l., e.g., 5–7 g./l.), and the highest possible temperature (ordinarily from about 80° to 120° F.) are desired for such final leach solution, and the control will be exercised toward those ends. If need be or if desired, additional acid and additional heat can be supplied at this stage of the process.

The portion of the stripped solution passed to the hydrolysis reactor, preferably from one-third to one-half, is heated therein to a temperature of from about 150 to 250° C. in accordance with well known chemical engineering techniques, to hydrolyze the alumina and precipitate it from the solution as basic aluminum sulfate. This may be regarded as a final crude product and sold as such or may be passed through a proper plant for production of alumina products by dissolution in sodium hydroxide in known manner, the pure alumina obtained being primarily useful in the production of metallic aluminum by the Hall electrolysis process.

It should be noted that acid is produced by the hydrolysis of the alumina in accordance with the following:

$$150°-250° C.$$
$$Al_2(SO_4)_3 + xH_2O \rightleftarrows Al_2O_3 \cdot 2SO_3 \cdot yH_2O + H_2SO_4$$

and that the resulting solution is not only hot, but has a pH in the range of about 1.0 to 1.3. Thus, this solution is ideally adapted to condition that other portion of the stripped leach solution which has been regenerated with respect to iron content.

Although the best way presently known of removing alumina from the recycled solution is as aforedescribed, there are other possible but much less attractive ways. Some of these are undesirable because of introducing other impurities. For example, sodium carbonate can be added to the solution to precipitate alumina. This leaves sodium in the solution, which can build up to the point where it must be removed by some special treatment or by the bleed-off of a portion of the solution, requiring replacement with fresh water. Others, such as the addition of ammonia or certain organic precipitants to the solution, result in slimy, gelatinous precipitates which are very difficult to remove. Nevertheless, elimination of alumina so far as possible from the recycled solution is a feature of the invention, however accomplished.

Moreover, elimination of both alumina and iron, by dividing the solution and treating one part for the elimination of iron and the other part for the elimination of alumina, and thereafter bringing the treated portions together for recycling, constitute a preferred way of carrying out the invention. Nevertheless, it is possible to treat the entire quantity of solution first for iron removal and then for alumina removal, or vice versa.

Again, although precipitation of iron as previously described is presently preferred, precipitation of iron from the solution can be carried out in other ways, for example, by electrolytic deposition.

In some instances, the broader aspects of the invention with respect to alumina may be utilized for the purpose of alumina production as a primary objective, particularly when the material being leached has been exhausted so far as copper recovery is concerned. Under such circumstances, the presence of ferrec sulfate in the leach solution is incidental.

Whereas there is here illustrated and described a certain preferred procedure which is presently regarded as the best mode of carrying out the invention, it should be understood that various changes may be made and other procedures adopted without departing from the disclosed inventive concepts particularly pointed out and claimed herebelow.

We claim:

1. A cyclic leaching process for recovering copper and other values from copper-bearing rock materials containing both oxide and sulfide copper minerals along with alumino-silicates and iron compounds, comprising the steps of
    passing an acidic, aqueous, ferric sulfate, leach solution through a mass of said materials;
    stripping copper from the effluent leach solution;
    dividing the stripped leach solution into two parts;
    hydrolyzing and precipitating iron in the form of basic iron sulfate from one of said parts of the stripped leach solution;
    hydrolyzing and precipitating alumina in the form of basic aluminum sulfate from the other of said parts of the stripped solution, with coincidental lowering of the pH thereof;
    remixing the two parts of the stripped solution following the aforesaid treatments thereof;
    passing the resulting solution, at a pH of about 1.09 to 2.8, through said mass of materials;
    and repeating the aforesaid procedure indefinitely.

2. The cyclic leaching process of claim 1, wherein the one part of the stripped leach solution is within the range of about one-half to two-thirds of the total volume of said solution and the other part is within the range of about one-third to one-half of the total volume thereof.

3. The cyclic leaching process of claim 1, wherein iron is hydrolyzed and precipitated from the one part of the stripped leach solution in amount to bring the total iron content of the recycled solution to within the range of about 2 to 5 grams per liter, with ferric iron content not more than about 1.0 gram per liter.

4. The cyclic leaching process of claim 1, wherein alumina is hydrolyzed and precipitated from the other part of the stripped leach solution in amount to bring the alumina content of the recycled solution to not more than about 7 grams per liter.

5. The cyclic leaching process of claim 1, wherein the solution resulting from remixing the two parts of the leach solution is passed through the mass of materials at a pH of about 1.9 to 2.4.

6. The cyclic leaching process of claim 1, wherein the solution resulting from remixing the two parts of the leach solution is passed through the mass of materials at a pH of about 2.1.

7. The cyclic leaching process of claim 1, wherein hydrolyzing of alumina is carried out by heating the solution to a temperature of from 150° to 250° C., and wherein the part of the leach solution subjected to this treatment is remixed with the other part, for recycling through the mass of materials.

8. The cyclic leaching process of claim 1, wherein the basic aluminum sulfate is recovered and subjected to a refining operation for the production of high purity alumina.

9. A cyclic leaching process for recovering copper and other values from copper-bearing rock materials containing both oxide and sulfite copper minerals along with alumino-silicates and iron compounds, comprising the steps of
    passing an acidic, aqueous, ferric sulfate, leach solution through a mass of said materials;
    stripping copper from the effluent leach solution;
    hydrolyzing and precipitating iron in the form of basic iron sulfate from stripped solution;
    hydrolyzing and precipitating alumina in the form of basic aluminum sulfate from stripped solution, with coincidental lowering of the pH thereof;
    passing the so-treated stripped solution at a pH of about 1.9 to 2.8 through the mass of materials;
    and repeating the aforesaid procedure idefinitely.

10. The cyclic leaching process of claim 9, wherein iron is hydrolized and precipitated in amount to bring the total iron content of the recycled solution to within the range of about 2 to 5 grams per liter, with ferric iron content not more than about 1.0 gram per liter.

11. The cyclic leaching process of claim 9, wherein alumina is hydrolyzed and precipitated in amount to bring the alumina content of the recycled solution to not more than about 7 grams per liter.

12. The cyclic leaching process of claim 9, wherein the solution is passed through the mass of materials at a pH of about 1.9 to 2.4.

13. The cyclic leaching process of claim 9, wherein the solution is passed through the mass of materials at a pH of about 2.1.

14. The cyclic leaching process of claim 9, wherein hydrolyzing of alumina is carried out by heating the solution to a temperature of from 150° to 250° C.

15. The cyclic leaching process of claim 9, wherein the basic aluminum sulfate is recovered and subjected to a refining operation for the production of high purity alumina.

16. A cyclic leaching process for recovering copper and other values from copper-bearing rock materials containing both oxide and sulfide copper minerals along with alumino-silicates and iron compounds, comprising the steps of
    passing an acidic, aqueous, ferric sulfate, leach solution containing from about 2 to 5 grams per liter of iron, of which no more than about 1.0 gram per liter is ferric, through a mass of said materials;

stripping copper from the effluent leach solution;

hydrolyznig and precipitating alumina in the form of basic aluminum sulfate from the stripped solution, with coincidental lowering of the pH thereof;

passing the so-treated stripped solution at a pH of about 1.9 to 2.8 through the mass of materials;

and repeating the aforesaid procedure indefinitely, while maintaining the said iron content of the recycled solution.

17. A cyclic leaching process for recovering copper and other values from copper-bearing rock materials containing both oxide and sulfide copper minerals along with alumino-silicates and iron-compounds, comprising the steps of passing an acidic aqueous, ferric sulfate, leach solution through a mass of said materials;

stripping copper from the effluent solution;

removing iron and aluminum values from such effluent leach solution to reduce the total iron content to not more than about 5 grams per liter and to reduce the alumina content to not more than about 7 grams per liter;

and re-using the solution for leaching.

18. A cyclic leaching process in accordance with claim 17, wherein the stripped solution is divided into two parts; one of said parts is treated for the removal of iron values and the other part is treated for the removal of aluminum values; and the so-treated parts are remixed following the respective treatments and before re-use.

19. A cyclic leaching process for recovering alumina from rock materials containing alumino-silicates, comprising the steps of passing an acidic, aqueous, leach solution through a mass of said materials;

removing aluminum values from the effluent leach solution;

and recycling the resulting leach solution indefinitely.

20. A cyclic leaching process for recovering alumina from rock materials containing alumino-silicates, comprising the steps of passing an acidic, aqueous, leach solution through a mass of said materials;

hydrolyzing and precipitationg alumina in the form of basic aluminum sulfate from the stripped solution;

and recycling the resulting leach solution indefinitely.

References Cited

UNITED STATES PATENTS

| 2,563,623 | 8/1951 | Scott | 75—104 |
| 2,775,517 | 12/1956 | Mancke | 75—104 |
| 2,829,964 | 4/1958 | Zimmerley et al. | 75—101 |
| 3,260,593 | 7/1966 | Zimmerley et al. | 75—104 |

DAVID L. RECK, *Primary Examiner.*

N. F. MARKVA, *Assistant Examiner.*

UNITED STATES PATENT OFFICE

CERTIFICATE OF CORRECTION

Patent No. 3,330,650                                           July 11, 1967

Stuart R. Zimmerley et al.

It is certified that error appears in the above identified patent and that said Letters Patent are hereby corrected as shown below:

Column 1, line 59, Column 3, lines 55 and 69, Column 4, line 45, Column 5, lines 7, 19, 21, 24, 28 and 34, "alumina" each occurrence, should read -- aluminum --. Column 5, line 38, "ferree" should read -- ferric --; line 67, "1.09" should read -- 1.9 --.

Signed and sealed this 6th day of January 1970.

(SEAL)
Attest:

Edward M. Fletcher, Jr.                                   WILLIAM E. SCHUYLER, JR.
Attesting Officer                                            Commissioner of Patents